US006084198A

United States Patent [19]

Birx

[11] Patent Number: 6,084,198

[45] Date of Patent: Jul. 4, 2000

[54] PLASMA GUN AND METHODS FOR THE USE THEREOF

[76] Inventor: Daniel Birx, Rte 2, 174D, 3300 Crismore La., Oakley, Calif. 94561

[21] Appl. No.: 09/187,436

[22] Filed: Nov. 6, 1998

Related U.S. Application Data

[63] Continuation-in-part of application No. 08/847,434, Apr. 28, 1997, Pat. No. 5,866,871.

[51] Int. Cl.[7] .......... B23K 10/00

[52] U.S. Cl. .......... 219/121.48; 219/121.57; 219/121.54; 219/121.59; 219/121.52; 378/119; 315/111.31

[58] Field of Search .......... 219/121.36, 121.48, 219/121.5, 121.52, 121.54, 121.57, 121.59; 378/34, 119; 313/231.31, 231.41, 331

[56] References Cited

U.S. PATENT DOCUMENTS

| | | | |
|---|---|---|---|
| 3,150,483 | 9/1964 | Mayfield et al. | 60/35.5 |
| 3,232,046 | 2/1966 | Meyer et al. | 60/35.5 |
| 3,276,176 | 10/1966 | Boden et al. | 60/202 |
| 3,961,197 | 6/1976 | Dawson | 250/493 |
| 3,969,628 | 7/1976 | Roberts et al. | 250/402 |
| 4,203,393 | 5/1980 | Giardini | 123/30 |
| 4,364,342 | 12/1982 | Asik | 123/143 |
| 4,369,758 | 1/1983 | Endo | 123/620 |
| 4,504,964 | 3/1985 | Cartz et al. | 378/119 |
| 4,507,588 | 3/1985 | Asmussen et al. | 315/39 |
| 4,536,884 | 8/1985 | Weiss et al. | 378/119 |
| 4,538,291 | 8/1985 | Iwamatsu | 378/119 |

(List continued on next page.)

OTHER PUBLICATIONS

Giordano, G., T. Letardi, F. Muzzi and E. Zheng., "Magnetic pulse compressor for prepulse discharge in spiker–sustainer excitation technique for XeCI lasers." *Rev. Sci. Instrum*, 65(8):2475–2481, 1994.

Jahn, Robert G., *Physics of Electric Propulsion*. New York, McGraw–Hill Book Company, 1968, pp i–325.

Matheu, J. W., "Formation of a High–Density deuterium Plasm Focus." *The Physics of Fluids*, 8(2):366–377, 1965.

(List continued on next page.)

*Primary Examiner*—Mark Paschall
*Attorney, Agent, or Firm*—Wolf, Greenfield & Sacks, P.C.

[57] ABSTRACT

A high pulse repetition frequency (PRF) plasma gun is provided, which gun inlets a selected propellant gas into a column formed between a center electrode and a coaxial outer electrode, utilizes a solid state high repetition rate pulse driver to provide a voltage across the electrodes and provides a plasma initiator at the base of the column, which is normally operative when the driver is fully charged. For preferred embodiments, the initiator includes RF driven electrodes. The plasma expands from the base end of the column and off the exit end thereof. When used as a thruster, for example in space applications, the driver voltage and electrode lengths are selected such that the plasma for each pulse exits the column at approximately the same time the voltage across the electrodes reaches zero, thereby maximizing the thrust. When used as a radiation source, the voltage and electrode length are selected such that the plasma exits the column when the current is maximum. The plasma is magnetically pinched as it exits the column, thereby raising the plasma temperature, energizing an element in gas state applied to the pinch, for example through the center electrode to provide radiation at a desired wavelength. The plasm gun parameters can be selected to achieve a desired wavelength, which may for example be within the EUV band. In particular, the pinch temperature is preferable high enough to ionize a significant portion of the gas applied to the pinch to its single election state, thereby producing radiation at the wavelength having maximum intensity If a longer, lower-intensity wavelength is desired, filtering of at least higher intensity, shorter wavelengths concurrently generated is desirable. Temperature at the pinch can also be selected to control the type of emission to minimize output angle of the radiation. The plasma gun of this invention, which is capable of operating at PRFs in the range of approximately 100 Hz to in excess of 5,000 Hz, may also be used in other applications.

25 Claims, 4 Drawing Sheets

U.S. PATENT DOCUMENTS

| | | | |
|---|---|---|---|
| 4,561,406 | 12/1985 | Ward | 123/536 |
| 4,618,971 | 10/1986 | Weiss et al. | 378/34 |
| 4,633,492 | 12/1986 | Weiss et al. | 378/119 |
| 4,635,282 | 1/1987 | Okada et al. | 378/34 |
| 4,774,914 | 10/1988 | Ward | 123/162 |
| 4,837,794 | 6/1989 | Riordan et al. | 378/119 |
| 5,241,244 | 8/1993 | Cirri | 315/111.41 |
| 5,442,910 | 8/1995 | Anderson | 60/266 |
| 5,866,871 | 2/1999 | Birx | 219/121.48 |

OTHER PUBLICATIONS

Shiloh, J., A. Fisher and N. Rostoker., “Z Pinch of a Gas Jet.” *Physical Review Letters*, 40(8):515–518, 1978.

Stallings, C. K. Childers, I. Roth and R. Schneider., “Imploding argon plasma experiments.” *Appl. Phys. Lott.*, 35(7): 524–525, 1979.

Raven, A., P. T. Rumsby, J. A. Stamper, O. Willi, R. Illingworth and R. Thareja, “Dependence of spontaneous magnetic fields in laser produced plasmas on target size and structure.” *Appl. Phys. Lott.*, 35(7): 526, 1979.

Pearlman, J. S., and J. C. Riordan, “X–ray lithography using a pulsed plasma source.” *J. Vac. Sci. Technol.*, 19(4):1190–1193, 1981.

Choi, P., A. E. Dangor, C. Deeney and C. D. Challis, “Temporal development of hard and soft x–ray emission from a gas–puff Z pinch.” *Rev. Sci. Instrum.*, 57(8):2162–2164, 1986.

Matthews, S. M. and R. S. Cooper, “Plasma sources for x–ray lithography.” *SPIE*, 333:136–139, 1982.

Bailey, J., Y. Ettinger and A. Fisher, “Evaluation of the gas puff z pinch as an x–ray lithography and microscopy source.” *Appl. Phys. Lett.*, 40(1):33–35, 1982.

“Gas plasmas yield x–rays for lithography,” *Electronics*, Jan. 27, 1982, pp. 40–41.

PLASMA GUN AND METHODS FOR THE USE THEREOF

RELATED APPLICATION

This application is a continuation-in-part of allowed application Ser. No. 08/847,434, filed Apr. 28, 1997 now U.S. Pat. No. 5,866,871, which is incorporated herein by reference.

FIELD OF THE INVENTION

This invention relates to plasma guns and more particularly to an improved plasma gun suitable for use as a space thruster or to produce radiation at selectable wavelengths, including wavelengths within the extreme ultraviolet band. The invention also involves methods for utilizing such plasma guns.

BACKGROUND OF THE INVENTION

As indicated in the parent application, the improved plasma gun disclosed therein finds application in a variety of environments for performing functions which either could not be performed previously, could not be performed well previously, or could only be performed without relatively large and expensive equipment. These functions include thrusters for satellite or other space station keeping and maneuvering applications, and the controlled generation of radiation at selected frequencies, generally within the extreme ultraviolet (EUV) band. The plasma guns disclosed for such applications were particularly advantageous in that they provided high reliability and pulse repetition frequency (PRF), and in particular a plasma gun having a PRF in excess of approximately 100 Hz and preferably a PRF in excess of 5,000 Hz for space applications and PRFs of at least 500 Hz and preferably 1,000 Hz for lithography or other applications requiring radiation generation.

In order to achieve these objectives, the plasma gun of the parent application had two general embodiments, one for space applications or other thruster applications, and a second embodiment radiation generator applications. In both cases, the plasma gun involved a center electrode and an outer electrode substantially coaxial with the center electrode, with a coaxial column being formed between the electrodes. A selected gas was introduced into the column through an inlet mechanism, and a plasma initiator was provided at the base end of the column. Finally, a solid state high repetition rate pulsed driver was provided which was operable on pulse initiation at the base of the column to deliver a high voltage pulse across the electrodes, the plasma expanding from the base end of the column and off the end thereof. For the thruster embodiment, the voltage of each of the pulses decreased over the duration of the pulse, and the pulse voltage and electrode length were selected such that the voltage across the electrodes reached a substantially zero value as the plasma exited the column. For this embodiment, the inlet mechanism preferably introduced the gas radially from the center electrode at the base end of the column, thereby enhancing plasma velocity uniformity across the column, plasma exiting the column for this embodiment at exhaust velocities which are currently in the range of approximately 10,000 to 100,000 meters per second, the exhaust velocity varying somewhat with application.

For the radiation source embodiment of the invention, the pulse voltage and electrode lengths are such that the current for each voltage pulse is at substantially its maximum as the plasma exits the column. The outer electrode for this embodiment of the invention is preferably the cathode electrode and may be solid or may be in the form of a plurality of substantially evenly spaced rods arranged in a circle. The inlet mechanism for this embodiment of the invention provides a substantially uniform gas fill in the column, resulting in the plasma being initially driven off the center electrode, the plasma being magnetically pinched as it exits the column, to produce a very high temperature at the end of the center electrode. A selected gas/element fed to the pinch as part of the ionized gas, through the center electrode or otherwise is ionized by the high temperature at the pinch to provide radiation at a desired wavelength. The wavelength is achieved by careful selection of various plasma gun parameters, including the selected gas/element fed to the pinch, current from the pulse driver, plasma temperature in the area of the pinch, and gas pressure in the column. The parent application for example indicates combinations of parameters for generating radiation at a wavelength of approximately 13 nm using for example lithium vapor as the gas fed to the pinch.

In order for the invention to function effectively in either of the above applications, it is critical that the preionization of the gas by the initiator provide an absolutely uniform preionization of the gas. For the parent application, this was achieved by forming holes evenly spaced around the column, with the gas either being introduced through the holes or directed at the holes. Electrodes were provided which were preferably mounted in the holes or otherwise at the base of the column, and preferably out of the column or closely adjacent thereto, which electrodes were fired to initiate plasma. The trigger electrodes were preferably evenly spaced around the base end of the column and were fired substantially simultaneously to provide uniform initiation of plasma at the base end, a DC signal being used to fire the electrodes. While this mechanism provides far more uniform plasma initiation than is possible with any prior arrangements, and is suitable for most applications, there are applications, particularly when the plasma gun is being used as a radiation source, where even more uniform plasma initiation is desirable. A need therefore exists for an improved plasma initiator providing such more uniform plasma initiation.

Further, while various gases/elements may be used with the plasma gun to provide a radiation source, each providing radiation at a number of different wavelengths, the energy/intensity at a given wavelength is roughly equal to $1/\lambda^4$ at high temperature. Thus, the lowest wavelength energy for a given element provides the highest energy output, and longer wavelengths have significantly lower energy, frequently many orders of magnitude lower energy. Therefore, to obtain maximum energy radiation from a given plasma gun, it is desirable to obtain most of the output at the lowest wavelength of the spectrum for the element ionized, which wavelength is obtained when the element/gas is in its single electron state. However, where a wavelength is desired which is not obtainable from an element in its single electron state, the number of wavelengths obtainable from element in this state being significantly restricted, particularly above 13.5 nm, then a technique must be provided for maximizing such wavelength in the output, and in particular to prevent such wavelength radiation from being overwhelmed by the far higher energy radiation, from the single electron state. Finally, it is desirable that radiation outputted from the plasma gun have as narrow an output angle as possible for certain applications.

A need therefore exists for an improved plasma gun and method for the use thereof which provides more uniform plasma initiation than is possible in prior art systems, including that of the parent application, which maximizes radiation at a desired wavelength for a wide range of radiations which may be obtained from the system and which permits narrowly focused beams to be obtained.

SUMMARY OF THE INVENTION

In accordance with the above, this application provides a high PRF plasma gun having a center electrode, an outer electrode substantially coaxial with the center electrode to form a coaxial column between the electrodes having a closed base end and an open exit end, an inlet mechanism for introducing a selected gas into the column, a plasma initiator at the base end of the column, an RF source selectively connected to drive the plasma initiator, and a solid state, high repetition rate pulsed driver operable on plasma initiation at the base of the column for delivering a high voltage pulse across the electrodes, the plasma expanding from the base end of the column and off the exit end thereof. The RF source may for example operate at a frequency in the range of 10 MHz to 1,000 MHz and may be used either alone or in conjunction with a DC source.

The plasma initiator is preferably a plurality of electrodes, such as spark plugs, spaced substantially uniformly about the column. For an illustrative embodiment, there may be 2 N discharge elements, where N is an integer, divided into N pairs of elements, the discharge elements of each pair being on opposite sides of the column, and the RF source providing as many as N phases, with elements of a pair having the same phase, and the phases being applied set as to be uniformed distributed. For an illustrative embodiment, there are two pairs of elements (i.e., N=2) which are 90° out of phase. For this embodiment, with the RF source operating at a wavelength $\lambda$, the source is preferably connected to one pair of discharge elements through a $\lambda/4$ length of line and to the other pair of elements through a $\lambda/2$ length of line. More generally, the line lengths could be $(2M-1)\lambda/4$ and $M\lambda/2$ respectfully, where M is an integer, however it generally is preferable to keep the line as short as possible. Each of these lines is closed at a selected point beyond where RF energy from the source is applied thereto and is connected to one of the elements at the other end. For a preferred embodiment, a $\lambda/4$ length of connecting line is provided between the source and each of the lines previously mentioned. More generally, where there are N pairs of discharge elements and the RF source is operating at a wavelength $\lambda$, a first $\lambda/4$ length of line is provided between the source and a first pair of elements, and a length of line $\lambda/x_i$ is provided for each other pair of elements, where $x_i$ for each pair of elements is selected to provide an appropriate phase to the elements.

Where the plasma gun is being used as a radiation source, the current for each voltage pulse initially increases to a maximum and then decreases to zero, the pulse voltage and electrode lengths being such that the current for each pulse is at substantially its maximum as the plasma exits the column. The inlet mechanism provides a substantially uniform gas fill to the column, resulting in the plasma being initially driven off the center electrode, plasma being magnetically pinched as it exits the column, significantly raising the plasma temperature at the exit end of the center electrode. An element in gas state delivered to the pinch, preferably through the center electrode, to provide the desired radiation is heated sufficiently by the pinch to ionize a majority of this gas to a single electron state. Alternatively, the pinch may raise the temperature of the radiating gas to provide radiation at a plurality of wavelengths. Where the plasma gun is a source of radiation at a selected wavelength, which wavelength has substantially less energy than shorter wavelengths also generated, a filter may be provided which substantially blocks radiation at the shorter wavelengths. This filter may, for example, be a mirror which reflects the desired radiation and absorbs all other radiations applied thereto. Finally, the temperature at the pinch may be selected so that it is sufficient at the desired wavelength to cause radiation resulting from stimulated emission of the element to be significantly greater than radiation resulting from spontaneous emission, resulting in a narrowing of output angle for the radiation.

Further, while it is preferable to have an RF source drive for the plasma initiator, even where RF is not used for the plasma initiator, having the temperature at the pinch be sufficient so as to ionize a majority of the radiating gas to single electron state is still desirable in many applications where the plasma gun is being used as a radiation source. The temperature at the pinch being sufficient so that radiation resulting from stimulated emission is significantly greater than radiation resulting from spontaneous emission may also be desirable in some applications, independent of the other features discussed above, so as to provide a narrowing of the output angle for the radiation. The way in which radiating gas is delivered to the pinch and the filtering of undesired wavelengths, particularly ones at higher intensity than the desired wavelength, are other independent novel features.

The foregoing and other objects, features and advantages of the invention will be apparent from the following more particular description of preferred embodiments of the invention as illustrated in the accompanying drawings and otherwise discussed herein.

IN THE DRAWINGS

DETAILED DESCRIPTION

Figure 1:
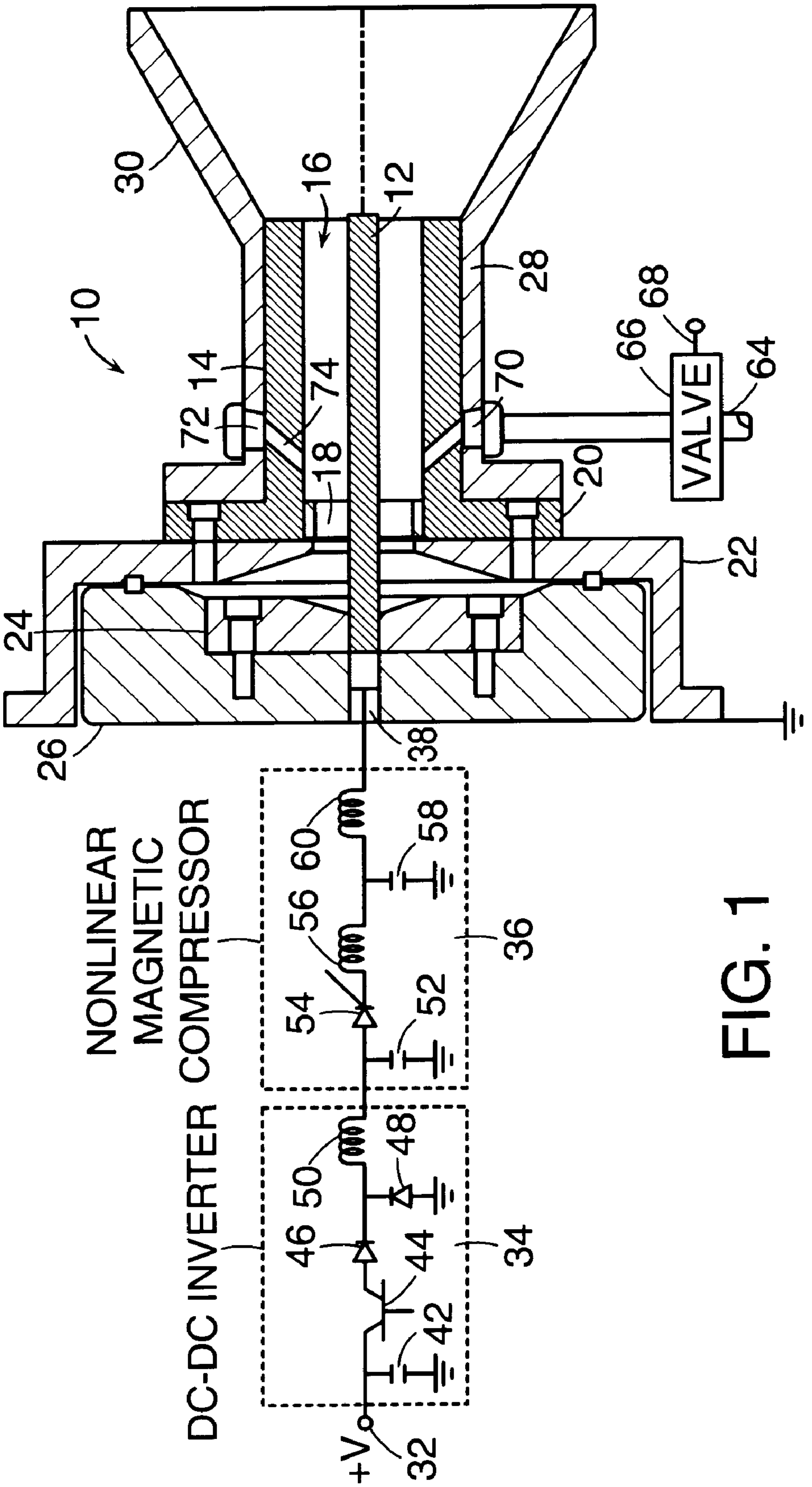
FIG. 1 is a semischematic, semi-side cutaway drawing of a first illustrative thruster embodiment of the invention.

Referring first to FIG. 1, the thruster 10 has a center electrode 12, which for this embodiment is the positive or anode electrode, and a concentric cathode, ground or return electrode 14, a channel 16 having a generally cylindrical shape being formed between the two electrodes. Channel 16 is defined at its base end by an insulator 18 in which center electrode 12 is mounted. Outer electrode 14 is mounted to a conductive housing member 20 which is connected through a conductive housing member 22 to ground. Center electrode 12 is mounted at its base end in an insulator 24 which is in turn mounted in an insulator 26. A cylindrical outer housing 28 surrounds outer electrode 14 and flares in area 30 beyond the front or exit end of the electrodes. The electrodes 12 and 14 may for example be formed of thoriated tungsten, titanium or stainless steel.

A positive voltage may be applied to center electrode 12 from a dc voltage source 32 through a dc-dc invertor 34, a nonlinear magnetic compressor 36 and a terminal 38 which connects to center electrode 12. Dc-dc invertor 34 has a storage capacitor 42, which may be a single large capacitor or a bank of capacitors, a control transistor 44, a pair of diodes 46 and 48 and an energy recovery inductor 50. Transistor 44 is preferably an insulated-gate bipolar transistor. Invertor 34 is utilized in a manner known in the art to transfer power from dc source 32 to nonlinear magnetic compressor 36. As will be discussed later, invertor 34 also functions to recover waste energy reflected from a mismatched load, and in particular from electrodes 12 and 14, to improve pulse generation efficiency.

Nonlinear magnetic compressor 36 is shown as having two stages, a first stage which includes a storage capacitor 52, a silicon controlled rectifier 54 and an inductor or saturable inductor 56. The second stage of the compressor includes a storage capacitor 58 and a saturable inductor 60. Additional compression stages may be provided if desired to obtain shorter, faster rising pulses and higher voltages. The manner in which nonlinear magnetic compression is accomplished in a circuit of this type is discussed in U.S. Pat. No. 5,142,166 and the description of this patent is incorporated herein by reference. Basically, circuit 36 uses the saturable cores as inductors in a resonance circuit. The core of each stage saturates before a significant fraction of the energy stored in the capacitors of the previous stage is transferred. The nonlinear saturation phenomenon increases the resonance frequency of the circuit by the square root of the decrease of the permeability as the core saturates. Energy is coupled faster and faster from one stage to the next. It should be noted that compression circuit 36 is efficient at transferring power in both directions since it not only acts to upshift the frequency in the forward direction, but also downshifts the frequency as a voltage pulse is reflected and cascades back up the chain. Energy which reflects from the mismatched load/electrodes can cascade back up the chain to appear as a reverse voltage being stored in capacitor 42 and to be added to the next pulse. In particular, when the reflected charge is recommuted into initial energy storage capacitor 42, current begins to flow in the energy recovery inductor 50. The combination of capacitor 42 and coil 50 forms a resonant circuit. After a half point [where $t=\pi/(L_{50}C_{42})^{1/2}$], the polarity of the voltage on capacitor 42 has been reversed, and this energy will reduce the energy required to recharge this capacitor from voltage source 32.

The drive circuits shown in FIG. 1 can also be matched to very low impedance loads and can produce complicated pulse shapes if required. The circuits are also adapted to operate at very high PRFs and can be tailored to provide voltages in excess of one Kv.

Propellant gas is shown in FIG. 1 as being delivered from a line 64, through a valve 66 under control of a signal on line 68, to a manifold 70 which feed a number of inlet port 72 in housing 28. There may, for example be four to eight ports 72 spaced substantially evenly around the periphery of housing 28 near the base end thereof. Ports 72 feed into holes 74 formed in electrode 14 which holes are angled to direct the propellant radially and inwardly toward the base of channel 16 near center electrode 12. Propellant gas may also be fed from the rear of channel 16.

Thruster 10 is designed to operate in space or in some other low pressure, near vacuum environment, and in particular at a pressure such that breakdown occurs on the low pressure side of the Paschen curve. While the pressure curve for which this is true will vary somewhat with the gas being utilized and other parameters of the thruster, this pressure is typically in the 0.01 to 10 Torr range and is approximately 1 Torr for preferred embodiments. For pressures in this range, increasing pressure in a region reduces the breakdown potential in that region, therefor enhancing the likelihood that breakdown will occur in such region. Therefor, theoretically, merely introducing the propellant gas at the base of column 16, and therefor increasing the pressure at this point, can result in breakdown/plasma initiation, occurring at this point as desired. However, as a practical matter, it is difficult both to control the gas pressure sufficiently to cause predictable breakdown and to have the pressure sufficiently uniform around the periphery of column 16 for breakdown to occur uniformly in the column rather than in a selected section of the column.

At least two things can be done to assure that plasma initiation occurs uniformly at the base of column 16 and that such breakdown occurs at the desired time. To understand how these breakdown enhancements are achieved, it should be understood that the plasma guns of this invention typically operate at pressures between 0.01 Torr and 10 Torr, and in particular, operate at pressures such that breakdown occurs on the low pressure side of the Paschen curve. For preferred embodiments, the pressure in column 16 is at approximately 1 Torr. In such a low pressure discharge, there are two key criteria which determine gas breakdown or initiation:

1. Electric field in the gas must exceed the breakdown field for the gas which depends on the gas used and the gas pressure. The breakdown field assumes a source of electrons at the cathode 14 that is known as the Paschen criteria. In the low pressure region in which the gun is operating, and for the dimensions of this device, the breakdown electric field decreases with increasing pressure (this occurring on the low pressure side of the Paschen curve). Therefor, breakdown occurs in column 16 at the point where the gas pressure is highest.
2. Second, there must be a source of electrons. Even if the average electric field exceeds the breakdown field, nothing will happen until the negative surface begins to emit electrons. In order to extract electrons from a surface, one of two conditions must occur. For the first condition, a potential difference must be produced near the surface which exceeds the cathode fall or cathode potential. The cathode fall/cathode potential is a function of gas pressure and of the composition and geometry of the surface. The higher the local gas pressure, the lower the required voltage. A re-entrant geometry such as a hole provides a greatly enhanced level of surface area to volume and will also reduce the cathode fall. This effect, whereby a hole acts preferentially as an electron source with respect to adjacent surface, is denoted the hollow cathode effect. The second condition is that a source of electrons can be created by a surface flashous trigger source. These conditions may be met individually or both may be employed. However, the voltage across the electrodes should be less than the sum of the gas breakdown potential and cathode fall potential to prevent spurious initiation.

Thus, in FIG. 1, a plurality of holes 74 are formed in cathode 14 through which gas is directed to the base of column 16, which holes terminate close to the base of the column. For preferred embodiments, a plurality of such holes would be evenly spaced around the periphery of column 16. The gas entering through these holes, coupled with the hollowed cathode effect resulting from the presence of these holes, results in significantly increased pressure in the area of these holes near the base of column 16, and thus in plasma initiation at this place in the column. While this method of plasma initiation is adequate for plasma initiation in some applications, for most applications of the plasma gun of this invention, particularly high PRF applications, it is preferable that trigger electrodes also be provided in the manner described for subsequent embodiments so that both conditions are met to assure both the uniformity and timeliness of plasma initiation.

When thruster 10 is to be utilized, valve 66 is initially opened to permit gas from a gas source to flow through manifold 70 into holes 74 leading to channel 16. Since valve 66 operates relatively slowly compared to other components of the system, valve 66 is left open long enough so that a quantity of gas flows into channel 16 sufficient to develop the desired thrust through multiple plasma initiations. For example, the cycle time of a solenoid valve which might be utilized as the valve 66 is a millisecond or more. Since plasma bursts can occur in two to three microseconds, and since gas can typically flow down the length of the 5 to 10 cm electrodes used for thrusters of preferred embodiments in approximately 1/4000th of a second, if there was only one pulse for each valve cycle, only about 1/10 of the propellant gas would be utilized. Therefor, to achieve high propellant efficiency, multiple bursts or pulses, for example at least ten, occur during a single opening of the valve. During each individual burst of pulses, the peak power would be in the order of several hundred kilowatts so as to create the required forces. The peak PRF is determined by two criteria. The impulse time must be long enough so that the plasma resulting from the previous pulse has either cleared the thruster exit or recombined. In addition, the impulse time must be shorter than the time required for cold propellant to travel the length of the electrodes. The latter criteria is determined to some extent by the gas utilized. For argon, with a typical length for the column 16 of 5 cm, the time duration for propellant to spread over the thruster electrode surface is only 0.1 msec, while for a heavier gas such as xenon, the time increases to approximately 0.2 msec. Therefor, a high thruster pulse repetition rate (i.e. approximately 5,000 pps or greater) will enable the plasma gun to achieve a high propellant efficiency approaching 90%. The burst lengths of the pulses during a single valving of the fluid can be varied from a few pulses to several million, with some fuel being wasted and a lower propellant efficiency therefor being achieved for short burst lengths. Therefor, if possible, the burst cycle should be long enough to allow at least full use of the propellant provided during a minimum-time cycling of the valve 66.

Before the propellant reaches the end of column 16, gate transistor 44 is enabled or opened, resulting in capacitor 58 becoming fully charged to provide a high voltage across the electrodes (400 to 800 volts for preferred embodiments) which, either alone or in conjunction with the firing of a trigger electrode in a manner to be described later results in plasma initiation at the base of column 16. This results in a sheath of plasma connecting the inner and outer conductors, current flowing readily between the electrodes through the plasma sheath, and creating a magnetic filed. The resulting magnetic pressure pushes axially on the plasma sheath providing a J×B Lorentz force which accelerates the plasma mass as it moves along the electrodes. This results in a very high plasma velocity, and the electrode length and initial charge are selected such that the rms current across the electrodes which initially increases with time and then decreases to zero, and the voltage which decreased as capacitor 58 discharge, both return to zero just as the plasma is ejected from the tip of the electrodes. When the plasma reaches the end of the coaxial structure, all of the gas has been entrained or drawn into the plasma and is driven off the end of the electrodes. This results in maximum gas mass and thus maximum momentum/thrust for each pulse. If the length of the structure has been chosen so that the capacitor is fully discharged when the plasma exits the electrode, then the current and voltage are zero and the ionized slug of gas leaves thruster 10 at a high velocity. Exhaust velocity in for example the range of 10,000 to 100,000 meters/second can be achieved with thrusters operating in this manner with the exhaust velocity utilized being optimum for a given thruster application. Flared end 30 of the thruster, by facilitating controlled expansion of the exiting gases allows for some of the residual thermal energy to be converted to thrust via isentropic thermodynamic expansion, but this effect has been found to be fairly negligible and tapered portion 30 is not generally employed. In fact, except for protection of electrode 12, which is not generally required in space, the weight of thruster 10 may be reduced by completely eliminating housing 28. A pulse burst may be terminated by disabling gate transistor 44 or by otherwise separating source 32 from circuit 36.

Figure 2:
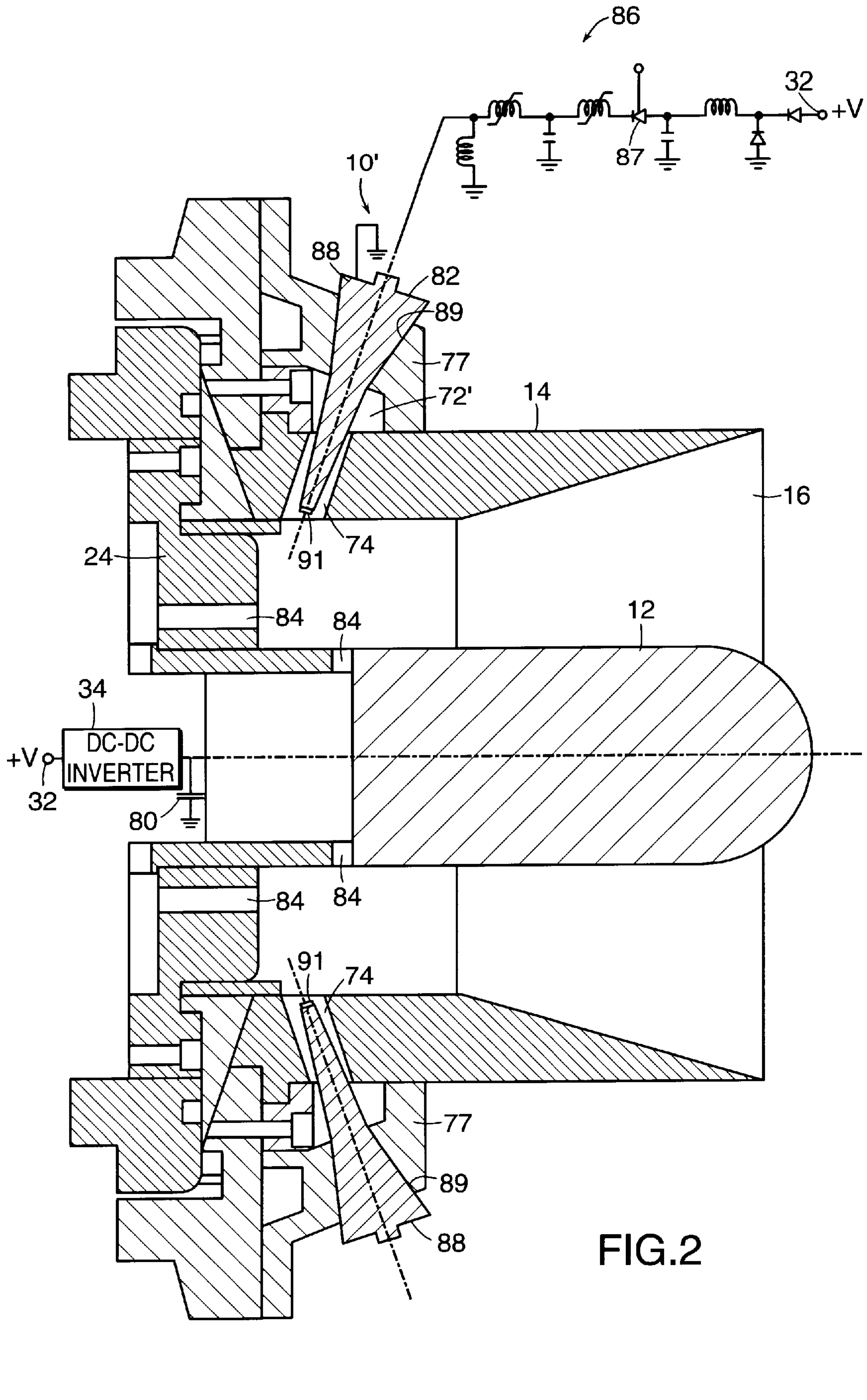
FIG. 2 is a semischematic, semi-cutaway side view drawing of alternative thruster embodiment of the invention.

FIG. 2 illustrates an alternative embodiment thruster 10' which differs in some respects from that shown in FIG. 1. First, nonlinear magnetic compressor 36 has been replaced by a single storage capacitor 80, which in practical applications would typically be a bank of capacitors to achieve a capacitance of approximately 100 microfarads. Second, cathode 14 tapers slightly towards its exit end. Third, spark plug-like trigger electrodes 82 are shown as being positioned in each of the holes 74 with a corresponding drive circuit 86 for the trigger electrodes; an internal gas manifold 72' formed by a housing member 77 is provided to feed propellant gas to holes 74, a gas inlet hole (not shown) being provided in member 77, and gas outlet holes 84 are shown formed in insulator 24 and in center electrode 12. As for the embodiment of FIG. 1, there would typically be a plurality of holes 74, for example four to eight, evenly spaced around the periphery of cathode 14, with a trigger electrode 82 in each hole 74, and a gas outlet or outlets 84 preferably opposite each hole 74 and directing gas thereat. For reasons to be discussed later, most of the gas inlet to chamber 16 flows from a suitable source, which may be the same source as for manifold 72' and holes 74, through outlets 84 and into the chamber near center electrode 12, gas flowing through holes 74 being primarily to facilitate ignition by the trigger electrodes.

While the capacitor 80 may be utilized in some applications in lieu of nonlinear magnetic compressor circuit 36 in order to store voltage to provide high voltage drive pulses, such an arrangement would typically be used in applications where either lower PRFs and or lower voltages are required, since compressor 36 is adapted to provide both shorter and higher voltage pulses. Circuit 36 also provides the pulses at a time determined by the voltage across capacitor 58 and a breakdown of nonlinear coil 60, which is a more predictable time than can be achieved with capacitor 80, which basically charges until breakdown occurs at the base of column 16 permitting the capacitor to discharge.

Trigger electrodes 82 are fired by a separate drive circuit 86 which receives voltage from source 32, but is otherwise independent of invertor 34 and either compressor 36 or capacitor 80. Drive circuit 86 has two non-linear compression stages and may be fired in response to an input signal to SCR 87 to initiate firing of the trigger electrodes. The signal to SCR 87 may for example be in response to detecting the voltage or charge across capacitor 80 and initiating firing when this voltage reaches a predetermined value or in response to a timer initiated when charging of capacitor 80 begins, firing occurring when a sufficient time has passed for the capacitor to reach the desired value. With a compressor 36, firing could be timed to occur when inductor 60 saturates. Controlled initiation at the base of the column 84 is enhanced by the re-entrant geometry of hole 74, and also by the fact that channel 16 is narrower at the base end thereof, further increasing pressure in this area and thus, for reasons previously discussed, assuring initiation of breakdown in this area.

Each trigger electrode 82 is a spark-plug like structure having a screw section which fits in an opening 89 in housing 77 and is screwed therein to secure the electrode in place. The forward end of electrode 82 has a diameter which is narrower than that of the opening so that propellant gas may flow through hole 74 around the trigger electrode. For example, the hole may be 0.44 inches in diameter while the trigger electrode at its lowest point is 0.40 inches. The trigger element 91 of the trigger electrode extends close to the end of hole 74 adjacent column 16, but preferably does not extend into column 16 so as to protect the electrode against the plasma forces developed in column 16. The end of the electrode may, for example, be spaced from the end of hole 74 by a distance roughly equal to the diameter of the hole (7/16").

While trigger electrode 82 and plasma electrodes 12 and 14 are both fired from common voltage source 32, the drive circuits for the two electrodes are independent and, while operating substantially concurrently, produce different voltages and powers. For example, while the plasma electrodes typically operate at 400 to 800 volts, the trigger electrode may have a 5 Kv voltage thereacross. However, this voltage is present for a much shorter time duration, for example, 100 ns, so that the power is much lower, for example 1/20 Joule.

Another potential problem with thrusters of the type shown in FIGS. 1 and 2 is that the Lorenz forces across column 16 are not uniformed, being greatest near center electrode 12 and decreasing more or less uniformly outward therefrom to the cathode outer electrode 14. As a result, gas plasma exits along an angled front, with gas exiting first from the center electrode and later for gas extending out toward the outer electrode. The outer electrode 14 could therefor be shorter to facilitate gas exiting the thruster uniformly across the thruster, although this is not done for preferred embodiments. The taper of this outer electrode is for the same reason as the taper in region 30 of housing 28 and is optional for the same reasons discussed in connection with this tapered region.

The problem of uneven velocity in column 16 is also dealt with in FIG. 2 by having most of the gas enter column 16 from and/or near the center electrode through holes 84, thereby resulting in a greater mass of gas at the center electrode than at the outer electrode. If this is done carefully so that the greater mass near the center electrode offsets the greater accelerating forces thereat, a more nearly uniform velocity can be achieve radially across column 16 so that gas/plasm exits uniformly (i.e. with a front perpendicular to the electrodes) off the end of the thruster. This correction is one reason why a shorter outer electrode is not generally required.

Except for the differences discussed above, the thruster of FIG. 2 operates in the same way as the thruster of FIG. 1. Further, while a single thruster is shown in the figures, in a space or other application, a plurality of such thrusters, for example twelve thrusters, could be utilized, each operating at less than 1 Joule/pulse and weighing less than 1 kg. All the thrusters would be powered by a central power supply, would use a central control system and would receive propellant from a common source. The latter is a particular advantage for the thruster of this invention in that maneuvering life of a space vehicle utilizing the thruster is not dictated by the fuel supply for the most frequently used thruster(s) as is the case for some solid fuel thrusters, but only by the total propellant aboard the vehicle.

Figure 3:
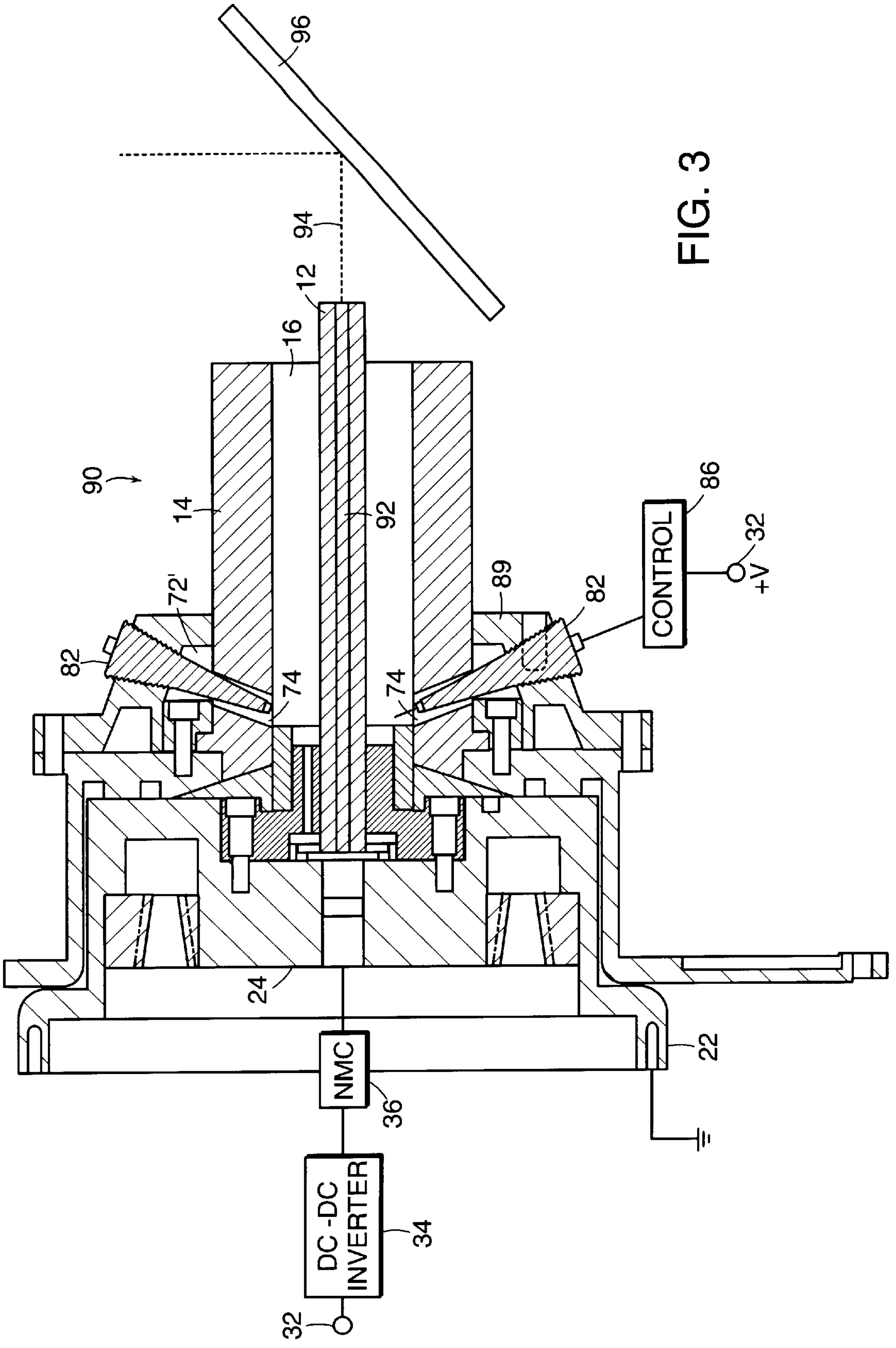
FIG. 3 is semischematic, semi-side cutaway view of a radiation source embodiment of the invention.

FIG. 3 shows another embodiment of a plasma gun in accordance with the teachings of this invention, which gun is adapted for use as a radiation source rather than as a thruster. This embodiment of the invention uses a driver like that shown in FIG. 1 with a dc-dc invertor 34 and a nonlinear magnetic compressor 36, and also has a manifold 72' applying gas through holes 74 of the cathode and around trigger electrodes 82. However, for this embodiment, propellant gas is not inputted from center electrode 12. The cathode electrode also does not taper for this embodiment of the invention and is of substantially the same length as the center electrode 12. The length of the electrodes 12 and 14 are also shorter for this embodiment of the invention than for the thruster embodiments so that gas/plasma reaches the end the electrodes/column when the discharge current is at a maximum. Typically, the capacitor will be approaching the one-half voltage point at this time. Further, for the radiation source application, outer electrode 14 may be solid or perforated. It has been found that best results are typically achieved with an outer electrode that consists of a collection of evenly spaced rods which form a circle. With the configuration described above, the magnetic field as the plasma is driven off of the end of the center electrode creates a force that will drive the plasma into a pinch and dramatically increase its temperature. The higher the current, and therefor the magnetic field, the higher will be the final plasma temperature. There is also no effort to profile the gas density so as to achieve more uniform velocity across column 16 and a static, uniform, gas fill is typically used. Therefor, the gas need not be introduced at the base end of column 16, although this is still preferred. The gas not being profiled results in the velocity being much higher at center conductor 12 than at the outer conductor 14. The capacitance at the driver, gas density and electrode length are adjusted to assure that the plasma surface is driven off the end of the center electrode as the current nears its maximum value.

Once the plasma is driven off the end of the center conductor, the plasma surface is pushed inward. The plasma forms an umbrella or water fountain shape. The current flowing through the plasma column immediately adjacent the tip of the center conductor provides an inlet pressure which inches the plasma column inward until the gas pressure reaches equilibrium with the inward directed magnetic pressure.

Temperatures more than 100 times hotter than surface of the sun can be achieved at the pinch using this technique. Radiation of a desired wavelength is obtained from the plasma gun 90 by introducing an element, generally in gas state, having a spectrum line at that wavelength at the pinch. While this may be achieved by the plasma gas functioning as the element, or by the element being introduced at the pinch in some other way, for preferred embodiments, the element is introduced through a center channel 92 formed in electrode 12. Center electrode 12 is preferably cooled at its base end by having cooling water, gas or other substance flow over the portion of the housing in contact therewith.

This provides a large temperature gradient with the tip of the cathode which, when a plasma pinch occurs, can be at a temperature of approximately 1,200° C. In particular, at high temperatures radiation intensity is inversely proportional to the fourth power of wavelength (i.e., intensity$\approx 1/\lambda^4$;$=(f/c)^4$; where $\lambda$=the wavelength of the desired radiation, f=the frequency of the desired radiation, and c=speed of light). Thus, for a given gas/element being fed through channel 92 to the pinch or otherwise delivered to the pinch, maximum intensity is obtained for the shortest wavelength signal radiated from the element, during decay from the 2P→1S state which signal is obtained for atoms of the element in their single electron state (i.e., atoms which have been raised to such a high energy state that all but one atom have been removed from the molecule). For atoms in the single electron state, the wavelength $\lambda$ is given by ($\lambda$=121.5 nm/$N^2$, where N is the atomic number of the element in chamber 92 which is being vaporized). Using this equation, the wavelengths having the highest energy for the first six elements of the periodic table are indicated in Table 1 below:

TABLE 1

| Element | Atomic Number | $\lambda_{OPT}$ |
|---|---|---|
| H | 1 | 121.5 nm |
| He | 2 | 30.375 nm |
| Li | 3 | 13.5 nm |
| Be | 4 | 7.6 nm |
| B | 5 | 4.86 nm |
| C | 6 | 3.375 nm |

To the extent gas applied through channel 92 is not fully converted to its single electron state, and even at the temperatures existing at the pinch most of the gas will not generally be ionized to this state, radiation will also be outputted at the other spectrum wavelengths for the element; however, as is apparent from the above equation, these radiations will be at much lower intensity, the intensity being a small fraction of the intensity for the single electron state. Thus, for example, xenon with an atomic number of 54 has a single electron wavelength of 0.04 nm which is of little value, but also has, as will be discussed shortly, energy at a wavelength of 13 nm which is useful. However, the energy at 13 nm is $1/10^{-10}$ of the energy at the single electron wavelength for a temperature at the pinch optimized for the single electron state and still generally orders of magnitude lower even at lesser pinch temperatures. This is because it is never possible to force more than a small fraction of the energy ($\leq 1/4$) to be emitted solely at 13 nm because of the shape of the black body emission curve relied on to determine the amplitude of relative lines and the temperature vary significantly.

Therefore, to use radiation at a wavelength other than the optimum single electron wavelength for an element, it is necessary to filter out the shorter wavelengths also being radiated for the element, which wavelengths are at much higher intensity. FIG. 3 shows one way of doing this wherein the radiation 94 being emitted from plasma gun 90 is applied to a mirror 96 of a type known in the art which is constructed to absorb all wavelengths of radiation except the desired wavelength, which wavelength is reflected toward the desirable target. Other filters, which at at least high pass filters for the desired wavelength and above might also be used.

Thus, if possible, it is desired to use an element for the gas or other element supplied to channel 92 which produces radiation at the desired wavelength in its highest energy single electron state. However, where either an element which emits radiation at a desired wavelength in its single electron state does not exist, and from Table 1 it is seen that above about 7.6 nm very few wavelengths are in fact available for elements in their maximum energy state, then an element must be found which emits radiation at the desired wavelength and a suitable filter, such as the filter mirror 96, utilized to obtain radiation at the desired wavelength. Since this radiation will be at far lower intensity than for radiation at the single-electron state wavelength, a larger and generally more costly device 90 would generally be required to obtain sufficient energy at the lower intensity wavelength. The radiation intensity at a given wavelength is given in terms of watts/meter$^2$/hertz and varies both as a function of the frequency or wavelength of the radiation, the temperature and the emissivity. Emissivity is a function which has a maximum value of one and it is important to choose a gas which has a maximum emissivity at the desired output frequency/wavelength. The optimum pinch temperature ($T_{OPT}$) for a given wavelength $\lambda$ can be determined from Wiens displacement law, $T_{OPT}$=0.2898 cm ×K°/$\lambda$, where K° is the temperature of the plasma in Kelvin.

Xenon may be flowed at a relatively slow rate through channel 90, since only a very small quantity of the gas is ionized to produce radiation during each pinch, to obtain 13 nm radiation. However, as discussed earlier, if xenon is used, the output radiation at 13 nm will be at relatively low intensity, and a filter such as filter 96 will be required to obtain useful radiation at this wavelength. For this reason, lithium, which from Table 1 can be seen to have a maximum intensity wavelength substantially at the desired wavelength (i.e., at 13.5 nm), is the preferred element for radiation at this wavelength.

Figure 4:
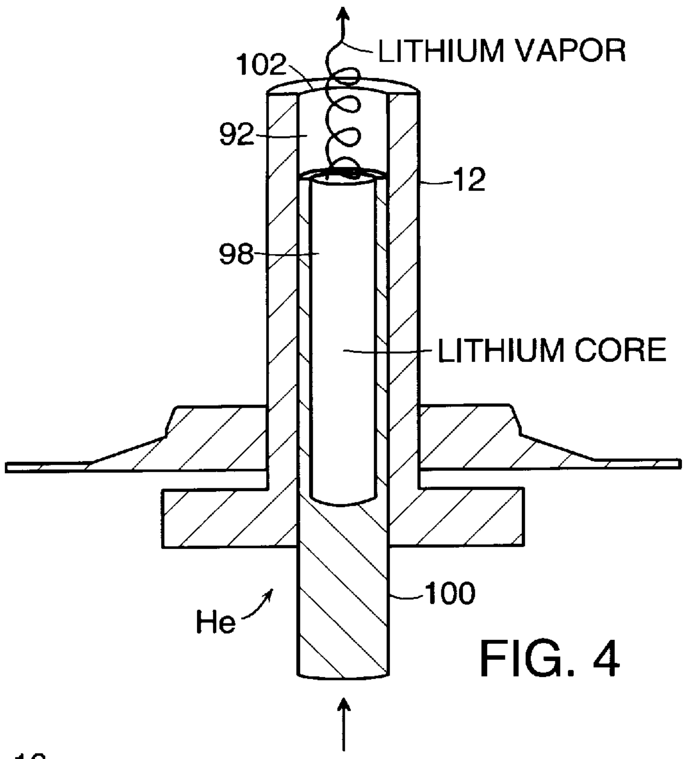
FIG. 4 is an enlarged cutaway view (not to scale) of the center electrode of FIG. 3 for one embodiment of the invention.

FIG. 4 illustrates a center electrode 12 for an embodiment utilizing lithium vapor to produce the desired radiation. Referring to this Figure, a solid lithium core 98 is held in a tube 100 of a material such as stainless steel, the tip of tube 100 being at a point along the center electrode near the tip which, during a plasma pinch, is at a temperature of approximately 900° C., resulting in the production of lithium vapor at a pressure of about 1 Torr off the end of lithium core 98. This lithium vapor flows out of hole 102 in the end of electrode 12 at a rate which displaces the argon or other plasma gas at the tip, this required flow rate being in the range of approximately 1–10 grams per year for an illustrative embodiment. Tube 100 may be slowly advanced in a suitable way to keep the forward tip of lithium core 98 at the appropriate locations. When core 98 is used up, it may be replaced. A small amount of helium gas is preferably fed up around tube 100 and out opening 102 to assure that only lithium and helium are present at the pinched zone, since argon, even in small quantities, would introduce higher energy, shorter wavelength lines which, if not filtered, could interfere with the 13 nm radiation at the desired target.

If xenon is used to obtain the 13 nm radiation, it must be confined to the immediate vicinity of the pinch because it is so absorptive at that wavelength. Where the radiation used is at a wavelength other than the single electron wavelength for the element/gas in column 92, as is the case for xenon, the temperature at the pinch may be controlled so as to ionize less of the element to its single electron state, thereby providing more radiation at the longer wavelengths and less radiation, although still much higher intensity radiation, at the shorter wavelength.

It is also desirable that the cone angle for the emitted radiation be as small as possible. Small cone angle is achieved when the spontaneous emission of radiation from the radiating gas at the pinch is much larger than the stimulated emission, stimulated emission being more dispersive. In particular, if it is assumed that the Boltzmann constant k times the temperature at the pinch is much larger than the frequency of the radiation f times the Planck constant h, then the radio of stimulated emission B to spontaneous emission A is given as (B/A=kT/hf). For example, when this ratio equals 20 (i.e., the plasma temperature is 20 times the photon energy of interest), then the half cone angle is approximately 25°. The higher the plasma temperature, the narrower the cone angle; however, the shorter the wavelength of the radiation, the harder it is to achieve narrow cone angles. However, cone angle is one more factor to be taken into account in selecting current and other parameters to achieve a desired temperature at the pinch.

Figure 5:
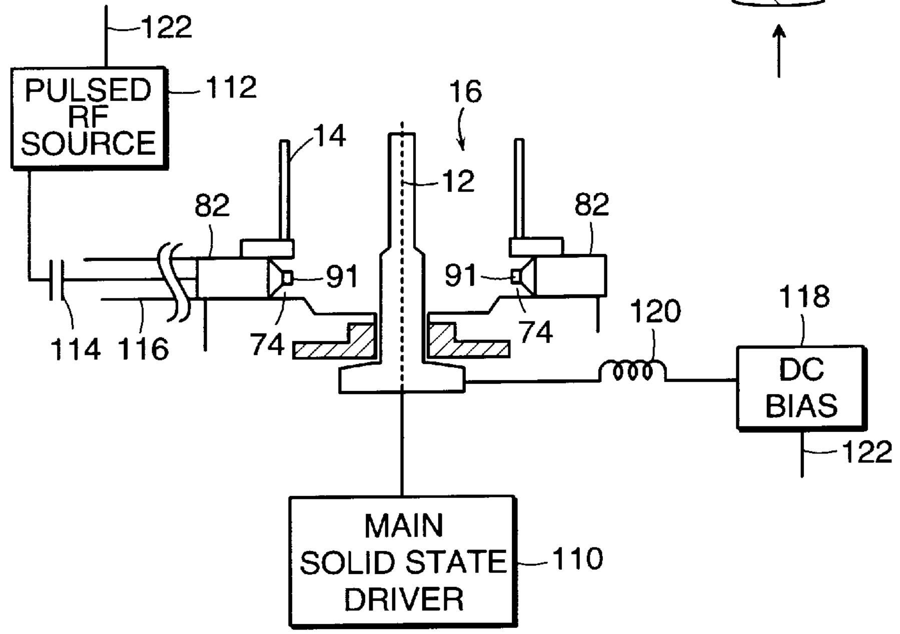
FIG. 5 is a semischematic, side cutaway view of an embodiment of the invention, which, depending on relative dimensions and other factors may be used either as a thruster or radiation source, having an RF initiator in accordance with the teachings of this invention.

FIG. 5 illustrates another embodiment of the invention which, depending on electrode length, whether a radiation emitting element/gas is introduced through the center electrode 12, and other factors, may be used as a thruster, radiation source, or other function for which plasma guns are utilized. The plasma gun is shown as being driven by a main solid state driver 110 which, for preferred embodiments, includes voltage source 32, DC/DC converter 34, and NMC 36. However, while this embodiment utilizes spark plugs 82 set in holes 74 for plasma initiation, it differs from prior embodiments in that the spark plug or other electrode is driven from a pulsed RF source 112 through a DC blocking capacitor 114 and a resonant coaxial line 116 which functions as a matching transformer. For preferred embodiments, the RF signal is at a frequency of 10 Mhz to 1,000 Mhz and is energized approximately 1 to 10 microseconds prior to energization of main driver 110. FIG. 5 also shows an optional DC bias source 118 which is connected through an AC filter coil 120 to center electrode 12. Source 118 may be voltage source 32, generally applied through a shaping and control circuit such as circuit 86, or may be a separate source depending on application.

While in FIG. 5 only two trigger electrodes or spark plugs 82, 91 are shown which are positioned on opposite sides of cavity 16, a plasma gun would preferably have at least four, and could have six or eight (or possible more) electrodes evenly spaced around the periphery of channel 16. With four electrodes, the RF signal applied to the electrodes shown would be at a first phase, and the RF signal applied to the electrodes at 90° to those shown would be at a second phase 90° out of phase with the first phase. For a plasma gun having six trigger electrodes, a three phase RF signal would be used, with each phase being applied to a pair of electrodes on opposite sides of chamber 16. With eight electrodes a two phase signal would preferably be utilized, with one phase being applied to every other electrode and the second phase to the ones in between, a four phase signal could also be used. The reason for using an RF rather than an DC signal for plasma initiation is that it has been found that RF applied to the initiator electrodes results in a more uniform, and nearly perfectly uniform, volumetric ionization or initialization in chamber 16. The DC bias from source 118, which is preferably applied simultaneously with the RF signal from source 112 in response to control signals on a line or lines 22, further contributes to the uniform ionization, particularly near the center electrode, and reduces the power requirements on RF source 112. The DC bias may be applied to the center electrode as shown, or may be applied to electrode 84 in series or parallel with to RF signal so that, for example, the RF signal modulates the DC bias.

Figure 6:
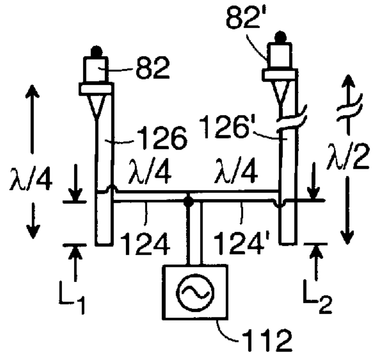
FIG. 6 is a schematic representation of a further implementation for obtaining RF initiation in a plasma gun of this invention.

FIG. 6 illustrates the connection of the RF source to two electrodes/spark plugs 82, 82' which are for example positioned 90° from each other. There would be two additional electrodes/spark plugs in the plasma gun, with a second electrode 82 being positioned at 180° to the electrode 82 shown and being connected in the manner shown for the electrode 82 and a second electrode 82' being positioned 180° from the electrode 82' shown and being connected in the same manner as this electrode. Source 112 is connected through quarter waveguide coaxial lines 124, 124' to a point near a shorted end of a coaxial line 126, 126', but spaced from the shorted end by a distance L1, L2, respectively. Coaxial line 126 is a quarter wavelength long and has electrode 82 at the unshorted end thereof, while coaxial line 126' is a half wavelength long and has electrode 82' at the unshorted end thereof. With line 126 a quarter wavelength long and line 126' a half wavelength long, the desired phase difference for the RF signal at electrodes 82 and 82' is achieved. The coaxial line also provide a large voltage step-up and, if the coupling positions/distances L1, L2 are chosen correctly, will look to the source as a matched load until breakdown is achieved. Using good quality coaxial lines, voltage step-up ratios on the order of 10–20:1 can easily be achieved. Once breakdown is achieved, the line appears as a short circuit at position L1. At the input coupling to the source λ/4 away from L1, the apparent impedance looks like an open circuit. Further, if the position L2 is chosen correctly, this line will appear as a matched load once breakdown is initiated. While it is desirable to keep lines 126, 126' as short as possible, desired phase and impedance matching could generally be achieved for the line with respective lengths of (2M−1)λ/4 and Mλ/2. Therefore, the RF source always sees a matched load, first creating a voltage step-up at one pair of spark plugs, and then providing a voltage step-down, but current step-up, at the second pair of spark plugs 82' once the plasma is initiated. The following Table 2 gives parameters for the RF source of FIG. 6 for an illustrative embodiment.

TABLE 2

| | Andrews-F5J4-50B Velocity = 0.81C | | | Andrews LD F4-50A Velocity = 0.88C | | |
|---|---|---|---|---|---|---|
| | 50 Mhz | 150 Mhz | 440 Mhz | 50 Mhz | 150 Mhz | 440 Mhz |
| Attn DB/100M | 2.5 | 4.5 | 7.0 | 1.5 | 3.0 | 5.0 |
| $l = \lambda/4$ | 1.25 M | .405 M | .13 M | 1.32 M | 0.44 M | 0.150 M |
| $S(V = V_o e^{-sl} c^{itrat})$ | $2.87 \times 10^{-3/M}$ | $5.18 \times 10^{-3/M}$ | $8.061 \times 10^{-3/M}$ | $1.727 \times 10^{-3/M}$ | $3.45 \times 10^{-3/M}$ | $5.758 \times 10^{-3/M}$ |
| $P_{recirculation} = Pin/(1 - e^{-4sl})/(\lambda/4)$ | 72 × Pin | 120 × Pin | 225 × Pin | 110 × Pin | 165 × Pin | 289 × Pin |
| $V_{rec}/V_{in} \cdot (\lambda/4)$ | 8.5 | 10.95 | 15 | 10.5 | 12.8 | 17.0 |
| $Sin^{-1}(V_{in}/V_{out})(\lambda/4)$ | 6.756° | 5.24° | 3.82° | 5.46° | 4.48° | 3.37° |
| $l_1(\lambda/4)$ | $9.12 \times 10^{-2}$M | $2.358 \times 10^{-2}$M | $5.857 \times 10^{-3/M}$ | $8.00 \times 10^{-2}$M | $2.19 \times 10^{-2}$M | $5.617 \times 10^{-3/M}$ |
| $l_o = 80/2$ | 2.43 M | 0.310 M | 0.276 M | 2.64 M | 0.88 M | 0.30 M |
| Precirculated/Pin $= 1(\lambda/2)/(1 - c^{-4sl})$ | 36 | 60 | 112.5 | 55 | 82.5 | 144.5 |
| $Sin^{-1}(V_{in}/V_{out})(\lambda/2)$ | 9.59° | 7.4° | 5.41° | 7.7° | 6.32° | 4.77° |
| $l_2(\lambda/2)$M | $12.95 \cdot 10^{-2}$ | $3.33 \cdot 10^{-21}$ | $0.829 \times 10^{-2}$ | $11.29 \times 10^{-2}$ | $3.089 \cdot 10^{-2}$ | $7.95 \cdot 10^{-3}$ |

The RF frequency and voltage, either from the RF source alone or from both the RF source and DC bias source 118, are determined from dimensions and operating pressure to give maximum uniformity. In general, the RF frequency must be chosen to be above a critical frequency, the critical frequency being the frequency below which electrons in the gas have time to be swept across the entire electrode gap in each one half cycle, and therefore lost. Above the critical frequency, electrons oscillate back and forth between electrodes facilitating the ionization of the gas. The critical frequency for a given fuel cell geometry is determined by first computing the mobility $$\text{Velocity of electron} = V_{elec} = \frac{q(v_c - i\omega)E}{m(v_c^2 + \omega^2)}$$

where $v_c$=collision frequency; ω=2πf where f is the frequency of the radiation; q=electronic charge; E=electric fields; m=electronic mass. Therefore, the time to transmit the gas is given by $$Dt = \frac{d}{V_{elec}}$$

where d=distance between electrode $$f_{critical} = \frac{1}{2\pi Dt} = \frac{1}{2\pi}\frac{V_{elect}}{d}$$

As for the thruster embodiments, it is required that the entire radiation source 90 be maintained in a near vacuum environment, and this is further required since radiation in the EUV band is easily absorbed and cannot be used to do useful work in other than a near vacuum environment. Since propellant efficiency is not as critical for this embodiment, there may be a single radiation burst for each valving, or the valving duration and number of pulses/bursts may be selected to provide the radiation for a desired duration.

While parameters have been discussed above for producing radiations at 13 nm, radiation at other wavelengths within the EUV band, or in some cases outside this band, may be obtained by controlling various parameters of the radiation source 90, and particularly by careful selection of the element/gas utilized, the maximum current from the high voltage source, the plasma temperature in the area of the pinch, the gas pressure in the column, and in some cases the radiation filter utilized.

While a large number of gases can be used as the plasma gas for the plasma guns described above, inert gases such as argon and xenon are frequently preferred. Other gases which may be used include nitrogen, hydrazine, helium, hydrogen, and neon. As indicated above, when the plasma gun is used as a radiation source, as for the FIG. 3 embodiment, a variety of elements/gases might also be utilized to achieve selected EUV or other wavelengths, the plasma and radiation gas in some cases being the same gas. Further, while various embodiments have been discussed above, it is apparent that these embodiments are by way of example only and are not limitations on the invention. For example, while the drivers illustrated are advantageous for the applications, other high PRF drivers having suitable voltage and rise times, and not requiring high voltage switching, might also be utilized. Similarly, while a variety of plasma initiation mechanisms have been described, with the RF driver electrode trigger being preferred, other methods for initiating plasma breakdown might also be utilized in suitable applications. The configurations of the electrodes and the applications given for the plasm gun are also by way illustration. Thus, while the invention has been particularly shown and described above with respect to preferred embodiments, the foregoing and other changes in forming detail may be made therein by one skilled in the art while still remaining within the spirit and scope of the invention and the invention is only to be limited by the following claims.

What is claimed is:

1. A high PRF plasma gun comprising:

a center electrode;

an outer electrode substantially coaxial with said center electrode, a coaxial column being formed between said electrodes, which column has a closed base end and an open exit end;

an inlet mechanism for introducing a selected gas into said column;

a plasma initiator at the base end of said column;

an RF source selectively connected to drive said plasma initiator; and a solid state, high repetition rate pulsed driver operable on plasma initiation at the base of said column for delivering a high voltage pulse across said electrodes, the plasma expanding from the base end of the column and off the exit end thereof.

2. A plasma gun as claimed in claim 1, wherein said RF source is operating at a frequency in the range of 10 Mhz to 1000 Mhz.

3. A plasma gun as claimed in claim 1, wherein said plasma initiator is a plurality of electrodes spaced substantially uniformly about said column.

4. A plasma gun as claimed in claim 3, wherein said electrodes are spark plugs.

5. A plasma gun as claimed in claim 3, wherein there are 2N discharge elements, where N is an integer, divided into N pairs of elements, the elements of each pair being on opposite sides of said column, and wherein said RF source provides up to N phases, with elements of a pair having the same phase applied thereto, and the phases being applied to the electrode pairs so as to be evenly distributed.

6. A plasma gun as claimed in claim 5, wherein N=2, and wherein said phases are 90° out of phase.

7. A plasma gun as claimed in claim 6, wherein said RF source is operating at a wavelength λ, wherein said source is connected to one pair of said discharge elements through a (2M −1)λ/4 length of line and to the another pair of elements through an Mλ/2 length line, where M is an integer.

8. A plasma gun as claimed in claim 7 wherein M=1, the line lengths being λ/4 and λ/2 respectively.

9. A plasma gun as claimed in claim 7, wherein each of said lines is closed at a selected point beyond where RF from said source is applied thereto and is connected to said elements at its other end.

10. A plasma gun as claimed in claim 9, including a λ/4 length of connecting line between said source and each of said lines.

11. A plasma gun as claimed in claim 5, wherein said RF source is operating at a wavelength λ, and including a first λ/4 length of line and a second $\lambda/x_i$ length of line between said source and each pair of elements, $x_i$ for each pair of elements being selected to provide an appropriate phase to the elements.

12. A plasma gun as claimed in claim 1, wherein the current for each voltage pulse initially increases to a maximum and then decreases to zero, the pulse voltage and electrode lengths being such that the current for each pulse is at substantially its maximum as the plasma exits the column; said inlet mechanism providing a substantially uniform gas fill in said column, resulting in the plasma being initially driven off the center electrode, the plasma being magnetically pinched as it exits the column, raising the temperature sufficiently at said pinch to ionize a majority of an ionizable element appearing at the pinch to a single electron state.

13. A plasma gun as claimed in claim 12 wherein said ionizable element is introduced to said pinch through said center electrode.

14. A plasma gun as claimed in claim 1, wherein the current for each voltage pulse initially increases to a maximum and then decreases to zero, the pulse voltage and electrode lengths being such that the current for each pulse is at substantially its maximum as the plasma exits the column; said inlet mechanism providing a substantially uniform gas fill in said column, resulting in the plasma being initially driven off the center electrode, the plasma being magnetically pinched as it exits the column, raising the temperature at the end of said center electrode sufficient to cause an ionizable element appearing at said end of said center electrode to produce radiation at a plurality of wavelengths, wherein said plasma gun is a source of radiation at a selected wavelength, which wavelength has substantially less energy than shorter wavelengths also generated, and including a filter which substantially blocks radiation at said shorter wavelengths.

15. A plasma gun as claimed in claim 14 wherein said filter is a mirror which reflects at said selected wavelength and absorbs at all other wavelengths.

16. A plasma gun as claimed in claim 1, wherein the current for each voltage pulse initially increases to a maximum and then decreases to zero, the pulse voltage and electrode lengths being such that the current for each pulse is at substantially its maximum as the plasma exits the column; said inlet mechanism providing a substantially uniform gas fill in said column, resulting in the plasma being initially driven off the center electrode, the plasma being magnetically pinched as it exits the column, raising the temperature at the pinch sufficiently to cause an ionizable element appearing at the pinch to produce radiation at a desired wavelength, the temperature at said pinch being sufficient so that, at the desired wavelength, radiation resulting from stimulated emission of said element is significantly greater than radiation resulting from spontaneous emission, resulting in a narrowing of output angle for said radiation.

17. A plasma gun as claimed in claim 1, including a DC source connected to drive said plasma initiator in addition to said RF source.

18. A high PRF source for radiation comprising:

a center electrode;

an outer electrode substantially coaxial with said center electrode, a coaxial column being formed between said electrodes, which column has a closed base end and an open exit end;

an inlet mechanism for introducing a selected gas into said column;

a plasma initiator at the base end of said column, and a solid state, high repetition rate pulsed diver operable on plasma initiation at the base of said column for delivering a high voltage pulse across said electrodes, the plasma expanding from the base end of the column and off the exit end thereof, the current for each voltage pulse initially increasing to a maximum and then decreasing to zero, the pulse voltage and electrode lengths being such that the current for each pulse is at substantially its maximum as the plasma exits the column; said inlet mechanism providing a substantially uniform gas fill in said column, resulting in the plasma being initially drive off the center electrode, the plasma being magnetically pinched as it exits the column, raising the temperature sufficiently at said pinch to ionize a majority of an ionizable element appearing at the pinch to a single electron state.

19. A high PRF source for radiation as claimed in claim 18 wherein said ionizable element is introduced to said pinch through said center electrode.

20. A source of radiation as claimed in claim 18 wherein said plasma pinch results in radiation from said source at a wavelength which is a function of the element and the electron state thereof, the temperature at said pinch being sufficient so that, at the desired wavelength, radiation resulting from stimulated emission of the element is significantly greater than radiation resulting from spontaneous emission, resulting in a narrowing of output angle for said radiation.

21. A high PRF source for radiation comprising:

a center electrode;

an outer electrode substantially coaxial with said center electrode, a coaxial column being formed between said electrodes, which column has a closed base end and an open exit end;

an inlet mechanism for introducing a selected gas into said column;

a solid state, high repetition rate pulsed diver operable on plasma initiation at the base of said column for delivering a high voltage pulse across said electrodes, the plasma expanding from the base end of the column and off the exit end thereof, the current for each voltage pulse initially increasing to a maximum and then decreasing to zero, the pulse voltage and electrode lengths being such that the current for each pulse is at substantially its maximum as the plasma exits the column; said inlet mechanism providing a substantially uniform gas fill in said column; and an ionizable element in gas state applied to said pinch, the temperature at said pinch being sufficient to cause said element to emit radiation of at least a selected wavelength.

22. A high PRF source of radiation as claimed in claim 21 wherein said ionizable element is applied to said pinch through an opening in said center electrode.

23. A high PRF source of radiation as claimed in claim 22 wherein said ionizable element is lithium, a lithium core being mounted in a center opening in said center electrode and being vaporized by the pinch temperature to emit lithium vapor to said pinch.

24. A high PRF source of radiation as claimed in claim 21 wherein said element emits radiation at a plurality of wavelengths, shorter ones of said wavelengths having higher intensity than longer ones of said wavelengths, wherein a desired wavelength of radiation from said source is a lower intensity longer wavelength, and including a filter to which said radiation is applied, which filter blocks at least the higher energy radiation at wavelengths shorter than the desired wavelength.

25. A high PRF source of radiation as claimed in claim 24 wherein said filter is a mirror which reflects at said selected wavelength and absorbs at all other wavelengths.

* * * * *